US012124391B2

(12) United States Patent
Youn et al.

(10) Patent No.: US 12,124,391 B2
(45) Date of Patent: *Oct. 22, 2024

(54) SEMI-PROGRAMMABLE AND RECONFIGURABLE CO-ACCELERATOR FOR A DEEP NEURAL NETWORK WITH NORMALIZATION OR NON-LINEARITY

(71) Applicant: Microsoft Technology Licensing, LLC, Redmond, WA (US)

(72) Inventors: Stephen Sangho Youn, Bellevue, WA (US); Steven Karl Reinhardt, Vancouver, WA (US); Jeremy Halden Fowers, Seattle, WA (US); Lok Chand Koppaka, Bellevue, WA (US); Kalin Ovtcharov, Snoqualmie, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/218,426

(22) Filed: Jul. 5, 2023

(65) Prior Publication Data

US 2023/0342320 A1 Oct. 26, 2023

Related U.S. Application Data

(63) Continuation of application No. 17/212,751, filed on Mar. 25, 2021, now Pat. No. 11,734,214.

(60) Provisional application No. 63/144,090, filed on Feb. 1, 2021.

(51) Int. Cl.
*G06F 13/40* (2006.01)
*G06N 3/04* (2023.01)

(52) U.S. Cl.
CPC .......... *G06F 13/4027* (2013.01); *G06N 3/04* (2013.01)

(58) Field of Classification Search
CPC ............................ G06F 13/4027; G06N 3/04
See application file for complete search history.

(56) References Cited

U.S. PATENT DOCUMENTS

| 2017/0236053 | A1* | 8/2017 | Lavigueur | G06N 3/045 |
| | | | | 706/31 |
| 2018/0247187 | A1* | 8/2018 | Chung | G06N 3/04 |
| 2018/0341495 | A1* | 11/2018 | Culurciello | G06F 9/3895 |
| 2019/0325296 | A1* | 10/2019 | Fowers | G06N 3/063 |
| 2020/0226202 | A1* | 7/2020 | Phelps | G06F 15/8046 |
| 2021/0042260 | A1* | 2/2021 | Reinhardt | G06F 9/30036 |
| 2021/0216873 | A1* | 7/2021 | Liu | G06N 3/04 |
| 2021/0312266 | A1* | 10/2021 | Youn | G06F 9/4843 |

* cited by examiner

*Primary Examiner* — Nimesh G Patel
(74) *Attorney, Agent, or Firm* — RAY QUINNEY & NEBEKER; Tiffany Healy

(57) ABSTRACT

The present disclosure relates to devices for using a configurable stacked architecture for a fixed function datapath with an accelerator for accelerating an operation or a layer of a deep neural network (DNN). The stacked architecture may have a fixed function datapath that includes one or more configurable micro-execution units that execute a series of vector, scalar, reduction, broadcasting, and normalization operations for a DNN layer operation. The fixed function datapath may be customizable based on the DNN or the operation.

20 Claims, 8 Drawing Sheets

SEMI-PROGRAMMABLE AND RECONFIGURABLE CO-ACCELERATOR FOR A DEEP NEURAL NETWORK WITH NORMALIZATION OR NON-LINEARITY

CROSS REFERENCE TO RELATED APPLICATIONS

This application is a Continuation of U.S. application Ser. No. 17/212,751, filed Mar. 25, 2021, which claims benefit and priority to U.S. Application No. 63/144,090, filed Feb. 1, 2021, which are incorporated herein by reference in their entireties.

BACKGROUND

As Deep Neural Networks (DNNs) for Natural Language Processing (NLP) applications grow in popularity in the cloud, the demand for compute acceleration has grown exponentially. Hardware accelerators are used to address this growing demand by offloading majority of the compute to custom hardware accelerators. To maximize performance and minimize cost and power, the architecture of these accelerators can be custom-tailored to match closely to the dataflow graphs of common DNN patterns. However, performance is limited in existing DNN accelerators when performing compute for NLP.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One example implementation relates to a configurable stacked architecture for a fixed function datapath for use with an accelerator to accelerate an operation of a deep neural network (DNN). The stacked architecture may include a plurality of configurable micro-scalar processing units (SPUs) that perform at least one scalar operation on vector values from a received vector. The stacked architecture may include a plurality of configurable micro-multi-functional units (MFUs) that perform vector operations on the vector values, wherein the plurality of configurable micro-SPUs and the plurality of configurable micro-MFUs are placed in an order to perform the operation of the DNN where an output of one micro-SPU of the plurality of configurable micro-SPUs is provided as an input to one micro-MFU of the plurality of configurable micro-MFUs.

Another example implementation relates to an accelerator. The accelerator may include a plurality of vector register files (VRFs) that provide one or more vectors with data for the accelerator. The accelerator may include a plurality of programmable multi-functional units (MFUs) in communication with the VRFs to perform vector operations on vector values from the one or more vectors. The accelerator may include at least one programmable scalar processing unit (SPU). The accelerator may include a configurable stacked architecture with a fixed function datapath in communication with the plurality of programmable MFUs, wherein the stacked architecture performs a non-linear operation on the vector values to accelerate a layer of a DNN.

Another example implementation relates to a configurable stacked architecture for a fixed function datapath for use with an accelerator to accelerate a softmax operation or a layer normalization operation of a deep neural network (DNN). The stacked architecture may include a first micro-scalar processing unit (SPUs) that performs a max reduction operation on received vector values from a programmable multi-functional unit (MFU) of the accelerator, a scalar inverse operation on the received vector values, and a broadcast operation that broadcasts the vector values to a vector. The stacked architecture may include a first micro-multi-functional unit (MFU) that receives the vector values from the first micro-SPU and performs a vector multiplication operation on the vector values. The stacked architecture may include a second micro-SPU that receives the vector values from the first micro-MFU and performs a reduction operation on the vector values, a scalar multiplication operation on the vector values, and the broadcast operation that broadcasts the vector values to the vector. The stacked architecture may include a second micro-MFU that receives the vector values from the second micro-SPU and performs a vector subtraction operation, a vector square root operation, and a vector exponentiation operation on the vector values of the vector. The stacked architecture may include a third micro-SPU that receives the vector values from the second micro-MFU and performs a reduction operation on the vector values, a scalar multiplication operation on the vector values, a scalar addition operation on the vector values, a scalar square root operation on the vector values, a scalar inverse operation on the vector values, and the broadcast operation that broadcasts the vector values to the vector. The stacked architecture may include a third micro-MFU that receives the vector from the third micro-SPU and performs a vector multiplication operation on the vector values of the vector.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims, or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

This disclosure generally relates to accelerators. As Deep Neural Networks (DNNs) for Natural Language Processing (NLP) applications grow in popularity in the cloud, the demand for compute acceleration has grown exponentially. Hardware accelerators are used to address this growing demand by offloading majority of the compute to custom hardware accelerators. To maximize performance and minimize cost and power, the architecture of accelerators may be custom-tailored to match closely to the dataflow graphs of common DNN patterns. A common DNN pattern that is popular in the NLP space is nonlinear DNN layers with normalization, which often limits performance of the DNN accelerator.

One well-known example of a normalization and/or a non-linear operation is the softmax function, which is common in many DNN models. The softmax function executes many different atomic operations: element-wise vector addition, multiplication, exponentiation, reductions over vector elements (e.g., summation, max), and scalar operations, such as, the inverse and broadcasting the scalar results into a vector. Running the atomic operations in a general vector/scalar processor, the softmax function must be computed with many instructions, which increases the code size and the decoding complexity. In addition, the instructions have a data dependency on each other making filling execution pipeline without inefficiencies difficult. This problem is especially exaggerated in a general purpose processor since the processor executes many different kinds of instructions and a normalization operation, such as, mean and standard deviation computation, is very expensive because of frequent memory accesses with multiple instructions, degrading the performance of a domain-specific processor for DNN acceleration.

Figure 1:
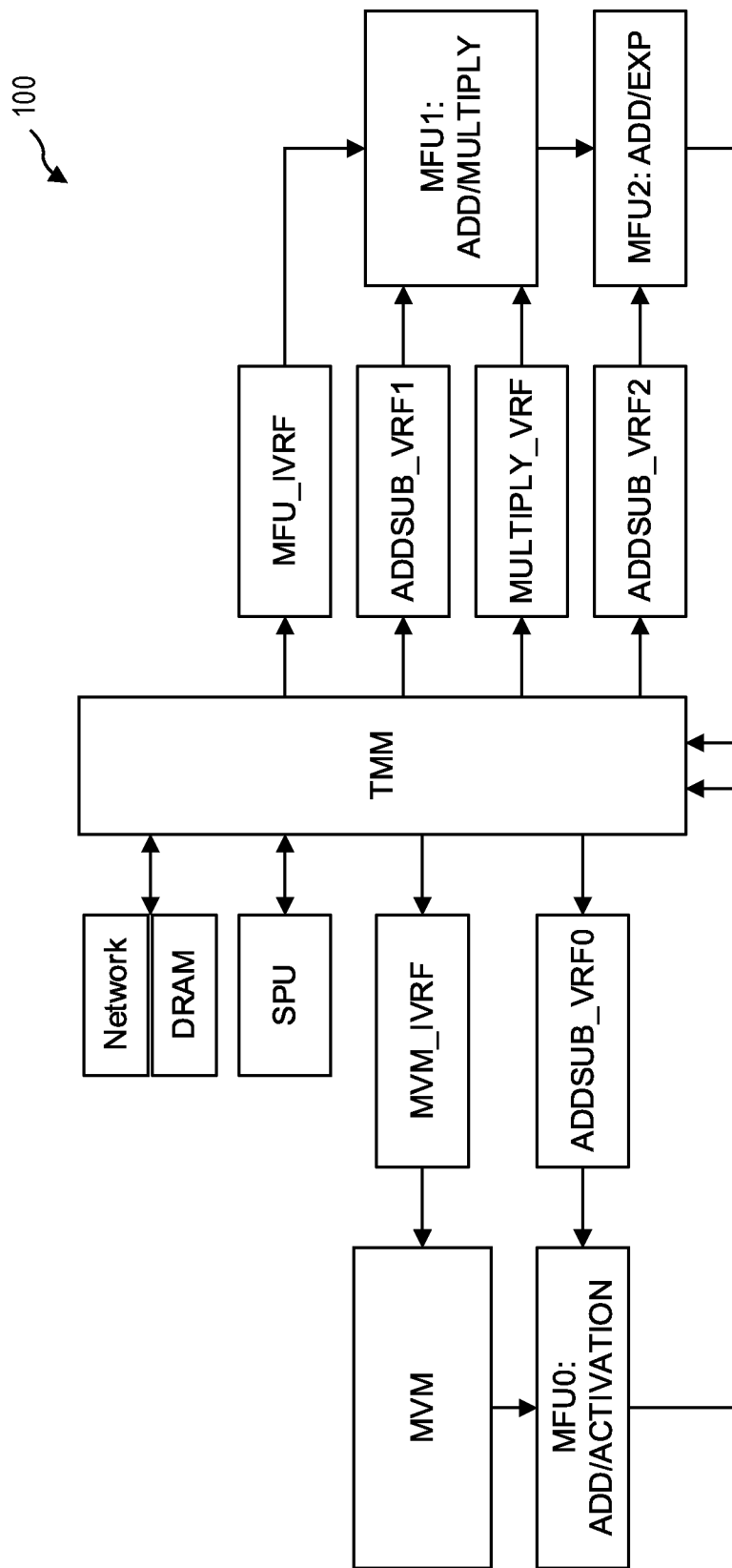
FIG. 1 illustrates an existing architecture for an accelerator.

One example of the degradation in performance of the DNN accelerator when performing the softmax function is illustrated in FIG. 1. FIG. 1 illustrates an existing architecture 100 for a DNN accelerator with multi-functional units (MFUs) and a scalar processing unit (SPU). The softmax operation executes multiple chained vector/scalar instructions through MFU1/MFU2 and SPU using multiple iterations to perform the softmax operation resulting in multiple chains of instructions. The execution pipes remain idle between chains with data dependencies, which causes a low hardware utilization rate and degrades the overall performance of the DNN accelerator. As such, performance is limited in existing DNN accelerators when performing compute for any DNN model that has softmax and/or any normalization layer. Performance is also limited for transformer-based DNN accelerators when performing compute for NLP.

The devices described herein provide a semi-programmable, co-accelerator capable of supporting the execution of both the Softmax and Layer Normalization operations by exploiting both pipeline and single instruction, multiple data (SIMD) parallelism in an area-efficient and highly-performant architecture. The devices described herein may be used for any non-linear DNN layer operation that involves vector, scalar, and/or reduction operations rather than a regular tensor and activation neural layers.

The devices described herein maximize the utilization of vector/scalar processing datapaths in the DNN acceleration by passing data directly between pipelined execution units, without round trips to memory, and customizing the quantity, variety, and order of execution units to the nonlinearity kernel such that the majority of execution units may be utilized simultaneously during execution.

The devices described herein stack both the programmable vector/scalar processing units and the hardwired but configurable vector/scalar processing units in a pipe. The architecture of the devices described herein maximizes the use of pipeline by increasing the depth of the pipeline (as opposed to other techniques which rely primarily or exclusively on data parallelism), which ensures the current DNN layer may be executed with maximal throughput in a full pipeline without inefficiencies between instructions. In some implementations, the architecture of the devices described herein maximizes the use of the pipeline by increasing both the depth of the pipeline and width of the pipeline using parallelism to scale performance by applying data (SIMD) parallelism. As such, wasting resources may be avoided for the datapath controls which rarely change but minimize the complexity of the control-path by adding a fixed-function instruction and a datapath that may execute a given DNN layer (such as softmax and/or layer normalization) in one instruction.

In contrast to an approach with a reduced instruction set computer (RISC) instruction architecture for vector/scalar processing, the architecture of the described devices takes a hybrid of complex instruction set computer (CISC) and RISC providing not only generic vector programmability with element-wise vector instructions (in addition, a programmable scalar unit may also be added into the execution pipe) but also a fixed-function instruction that optimally runs the required DNN layer operation (such as softmax and layer-normalization). The architecture of the described devices requires a significantly lower area/resource because a series of micro-operations is optimally pre-scheduled in the hardware execution unit pipe regardless of the software/firmware codes. Moreover, the architecture of the described devices may use a serial and bypass micro-architecture for the fixed-function datapath. The structure of the architecture of the described devices may have a configurable limited vector processing unit (e.g., micro-MFU, or u-MFU) and a configurable limited vector-to-scalar, scalar-to-scalar, scalar-to-vector processing unit with a forwarding path (e.g., micro-SPU, or u-SPU). The micro-MFU and the micro-SPU modules may be stacked with the structure to implement a given non-linear DNN layer to accelerate, which can be further optimized by flattening afterwards.

The architecture of the devices described herein provide programmability and configurability to fully utilize the datapath for a variety of models and inference parameters. The architecture may execute generic element-wise vector instructions (e.g., add a mask in the scaled-dot-product operation, add arbitrary vectors before the layer-normalization operations). Moreover, the accelerator datapath of the devices described herein has its own programmability that may execute different DNN layer acceleration instructions. For example, the accelerator datapaths of the devices described herein has a programmability on its connection on the series of vector add, multiply, exponentiation, max reductions, sum reductions, and broadcasting execution units so that the given datapath is maximally utilized for both softmax and layer-normalization DNN layers, which can be dynamically configured with instructions. One technical advantage of the programmability allows the architecture of the devices described herein to support a wide range of transformer-based models (e.g., models with different number of heads) and different queries coming for inference (e.g., different sequence lengths of input tokens).

In addition, the fixed function datapath of the architecture of the devices described herein is a micro-architecture that includes a series of vector micro-execution units and vector-to-scalar reduction, scalar, scalar-to-vector micro-execution units with a forwarding path. One technical advantage of the structure of the architecture of the devices is the re-configuration of the structure is easy and the structure may cover wide range of non-linear DNN layers that can be implemented with vector/scalar and reduction/broadcasting operations.

Another technical advantage of the devices described herein is improving the performance of a DNN accelerator by resolving a low hardware utilization problem, which especially occurs at the vector/scalar processing datapath when executing a normalization and/or non-linear operation.

Another technical advantage is the described architecture is both programmable from software and configurable from hardware, which is especially helpful in the field programmable gate array (FPGA) platform. The MFUs keep their programmability and may be used for many different purposes (e.g., element-wise vector addition, multiplication, passthrough, for example, mask addition in softmax, and/or input addition in layer-normalization). The fixed-function datapath is also programmable so that it can execute a series of vector/scalar/normalization operations to run either softmax, layer normalization, and/or passthrough. The fixed-function datapath is configurable on the hardware level too with the proposed micro-architecture with the fixed-function datapath that is easily customizable depending on a DNN model the micro-architecture accelerates, which is especially helpful in FPGA platform that a fixed-function datapath can be reconfigured and optimized depending on DNN models to accelerate.

Figure 2:
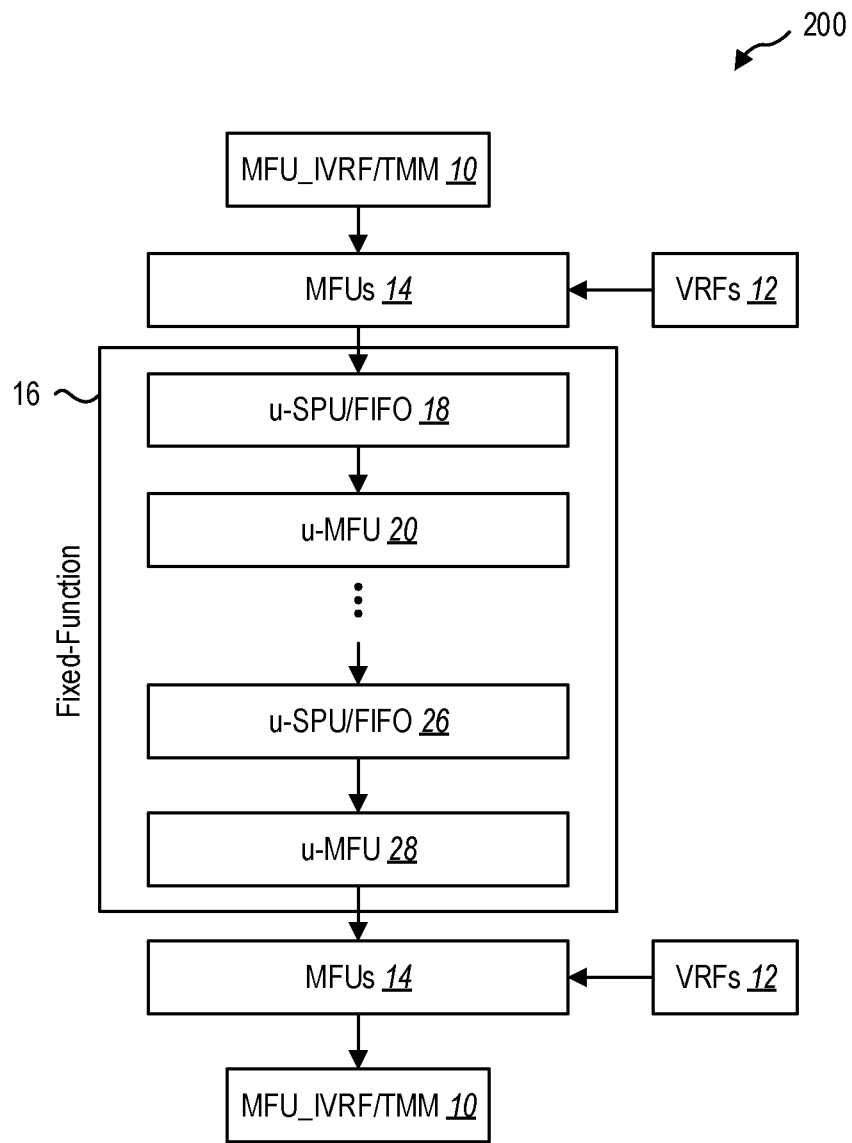
FIG. 2 illustrates an example stacked architecture with a fixed function datapath for use with an accelerator in accordance with some implementations.
Figure 5:
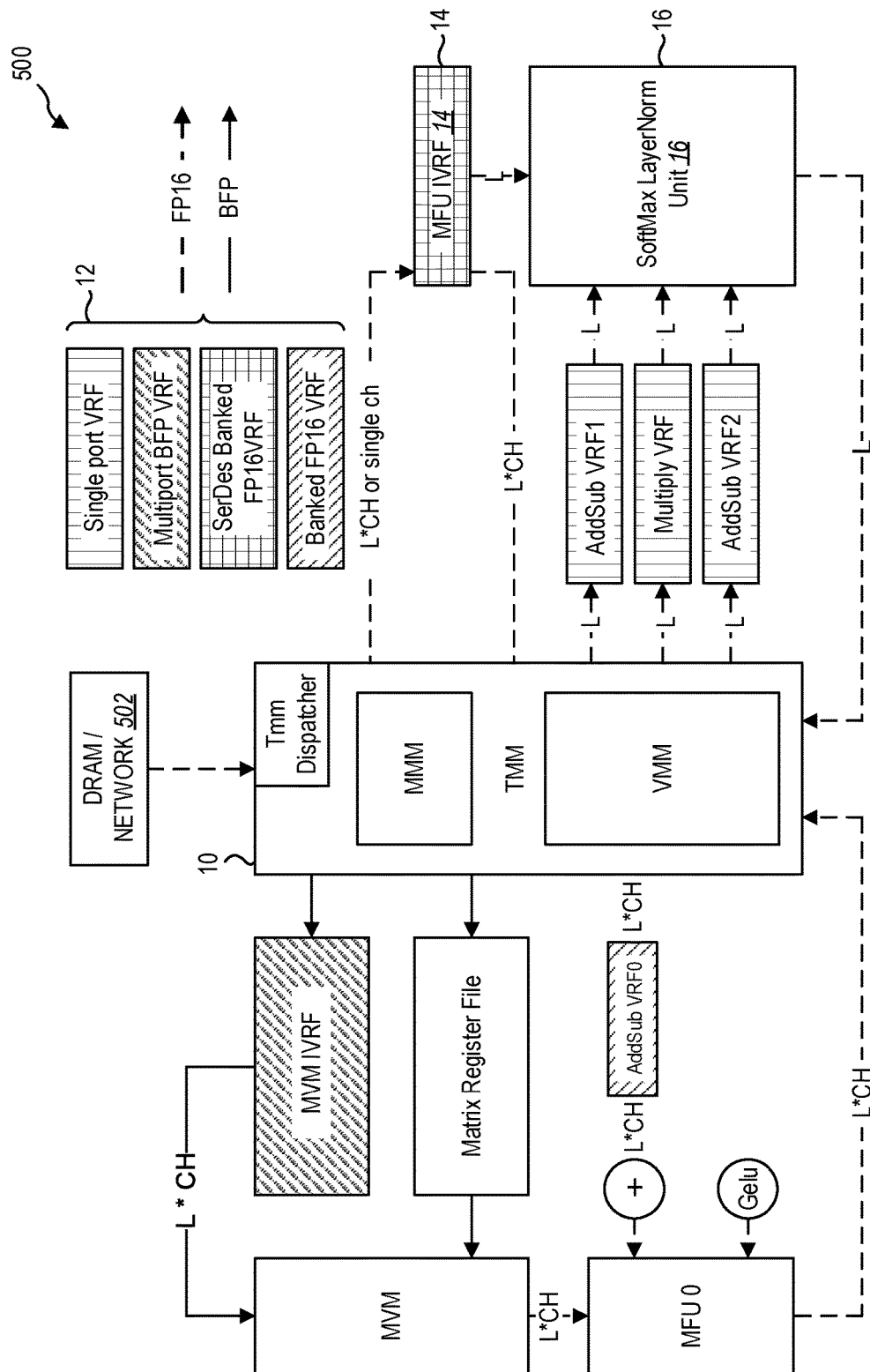
FIG. 5 illustrates an example architecture for an accelerator that uses a stacked architecture with a fixed function datapath in accordance with some implementations.

Referring now to FIG. 2, illustrated is an example of a programmable and/or configurable stacked architecture 200 to perform vector operations for an accelerator 500 (FIG. 5). The stacked architecture 200 is composed of modular generic vector processing blocks (MFU_IVRF/TMM 10, MFUs 14), scalar processing blocks with both reduction and broadcasting, and/or one or more vector register files (VRF)s 12 in communication with the MFUs 14. The MFUs 14 may be programmable and may perform any vector element wise operation (e.g., addition or multiplication). The DNN layer operation may execute generic element-wise vector instructions using the MFUs 14 (add a mask in the scaled-dot-product operation, add arbitrary vectors) before the layer-normalization operations. As such, the MFUs 14 may be used for many different purposes (e.g., element-wise vector addition, multiplication, passthrough, for example, mask addition in softmax, and/or input addition in layer-normalization).

In addition, the stacked architecture 200 may include a fixed function datapath 16. The fixed function datapath 16 may include one or more configurable micro-execution units (e.g., configurable micro-SPUs and first in, first out (FIFO) 18, 26 and/or configurable micro-MFUs 20, 28) that execute a series of vector, scalar, reduction, broadcasting, and/or normalization operations for a DNN layer operation in one instruction. The DNN layer operation may include any non-linear operation that involves vector, scalar, and/or reduction operations rather than a regular tensor and activation neural layers. Examples of the DNN layer operation may include softmax and/or layer-normalization. The fixed function datapath 16 is a customizable datapath that executes a series of vector, scalar, reduction, and/or broadcasting operations for a specific DNN non-linear layer.

The fixed function datapath 16 may include a series of micro-operations pre-scheduled in the hardware execution unit pipe. The plurality of configurable micro-execution units (e.g., micro-SPUs and FIFO 18, 26 and micro MFUs 20, 28) perform the series of micro-operations for the DNN layer operation. The micro-SPUs 18, 26 runs the scalar operations so that the values of the vector have the same scalability. The micro-SPUs 18, 26 also perform reduction, broadcasting, and/or normalization instructions on the values of the vectors. The micro-SPUs 18, 26 also supports forwarding with FIFO. The micro-MFUs 20, 28 perform the vector operations, such as, but not limited to, addition, multiplication, square root, and/or exponentiation.

The micro-execution units included in the fixed function datapath 16 may only support a limited subset of operations, such as, non-linear operations. By limiting the operations supported by the micro-execution units or making the scope of the operations performed by the micro-execution units to only necessary operations, the fixed function datapath 16 may be optimized further resulting in a better resource and/or area utilization. The micro-MFUs 20, 28 may include limited vector processing units. In addition, the micro-SPUs 18, 26 may be limited vector-to-scalar, scalar-to-scalar, scalar-to-vector processing units with a forwarding path. As such, instead of the micro-execution units performing all operations, the micro-execution units may only support a limited subset of operations to perform for the DNN layer.

The stacked architecture 200 may increase the depth of the accelerator pipeline by layering a plurality of micro-execution units (e.g., micro-SPUs and FIFO 18, 26 and micro-MFUs 20, 28) for performing the vector, scalar, reduction, broadcasting, and/or normalization operations. The stacked architecture 200 may include a serial and bypass micro-architecture for the fixed-function datapath 16.

The micro-execution units (e.g., micro-SPUs and FIFO 18, 26 and micro MFUs 20, 28) modules may be stacked in an order to implement a specific non-linear DNN layer to accelerate. The fixed function datapath 16 may have a forwarding path where an output of a micro-SPU 18, 26 is provided as input to a micro-MFU 20, 26 and the output of the micro-MFU 20, 26 is provided as input to a next micro-SPU 18, 26 in the order. In addition, the fixed function datapath 16 may include a plurality of FIFO structures that receive the vector outputs from a micro-MFU 20, 26 and forwards the vector output to a next micro-MFU 20, 26 in the order.

The micro-execution units (e.g., micro-SPUs and FIFO 18, 26 and micro MFUs 20, 28) may be mapped to the different operations performed for the DNN layer operation. In some implementations, the micro-MFUs 20, 28 perform different operations. In some implementations, the micro-MFUs 20, 28 perform the same operations. In some implementations, the micro-SPUs and FIFO 18, 26 perform different operations. In some implementations, the micro-SPUs and FIFO 18, 26 perform the same operations.

The fixed-function datapath 16 is programmable to execute a series of vector, scalar, normalization operations, such as, but not limited to softmax, layerNorm, and/or passthrough. The fixed function datapath 16 may change when necessary to support different DNN models and/or to support different DNN layer operations. The modules used in the fixed function datapath 16 may be optimized depending on the DNN models to accelerate and/or the DNN layer operations.

One example includes adding one or more micro-SPU modules 18, 26 and/or one or more micro-MFU modules 20, 28 to the fixed function datapath 16. Another example includes removing one or more micro-SPU modules 18, 26 and/or one or more micro-MFU modules 20, 28 from the fixed function datapath 16. Another example includes adding one or more micro-SPU modules 18, 26 and/or one or more micro-MFU modules 20, 28 and removing one or more micro-SPU modules 18, 26 and/or one or more micro-MFU modules 20, 28 from the fixed function datapath 16. Another example includes skipping one or more micro-SPU modules 18, 26 and/or one or more micro-MFU modules 20, 28. Another example includes rearranging the order of the one or more micro-MFU modules 20, 28 and/or the micro-SPU modules 18, 26. As such, the quantity, variety, and/or an order of the configurable micro-execution units of the fixed function datapath 16 may change and/or may be customized based on the DNN layer operation and/or the DNN model.

Thus, the stacked architecture 200 provides sufficient programmability and/or configurability to fully utilize the fixed function datapath 16 for a variety of models and inference parameters. The architecture 200 maximizes the use of the vector and/or scalar processing datapaths in the DNN accelerator 500 by passing data directly between pipelined execution units without roundtrips to memory. For example, the architecture 200 may not make intermediate accesses to memory when performing the operations. In addition, the architecture 200 customizes the quantity, variety, and/or order of the micro-execution units to the nonlinearity kernel so that majority of the micro-execution units may be used simultaneously during execution. Moreover, the modular units (e.g., micro MFU 20, 28 and micro-SPU modules and FIFO 18, 26) make the design of the accelerator 500 easier, more readable, extensible, and easier to debug. The fixed function datapath 16 requires a significantly lower area and/or resources used because a series of micro-operations is optimally pre-scheduled in the hardware execution unit pipe regardless of the software and/or firmware codes.

Figure 3:
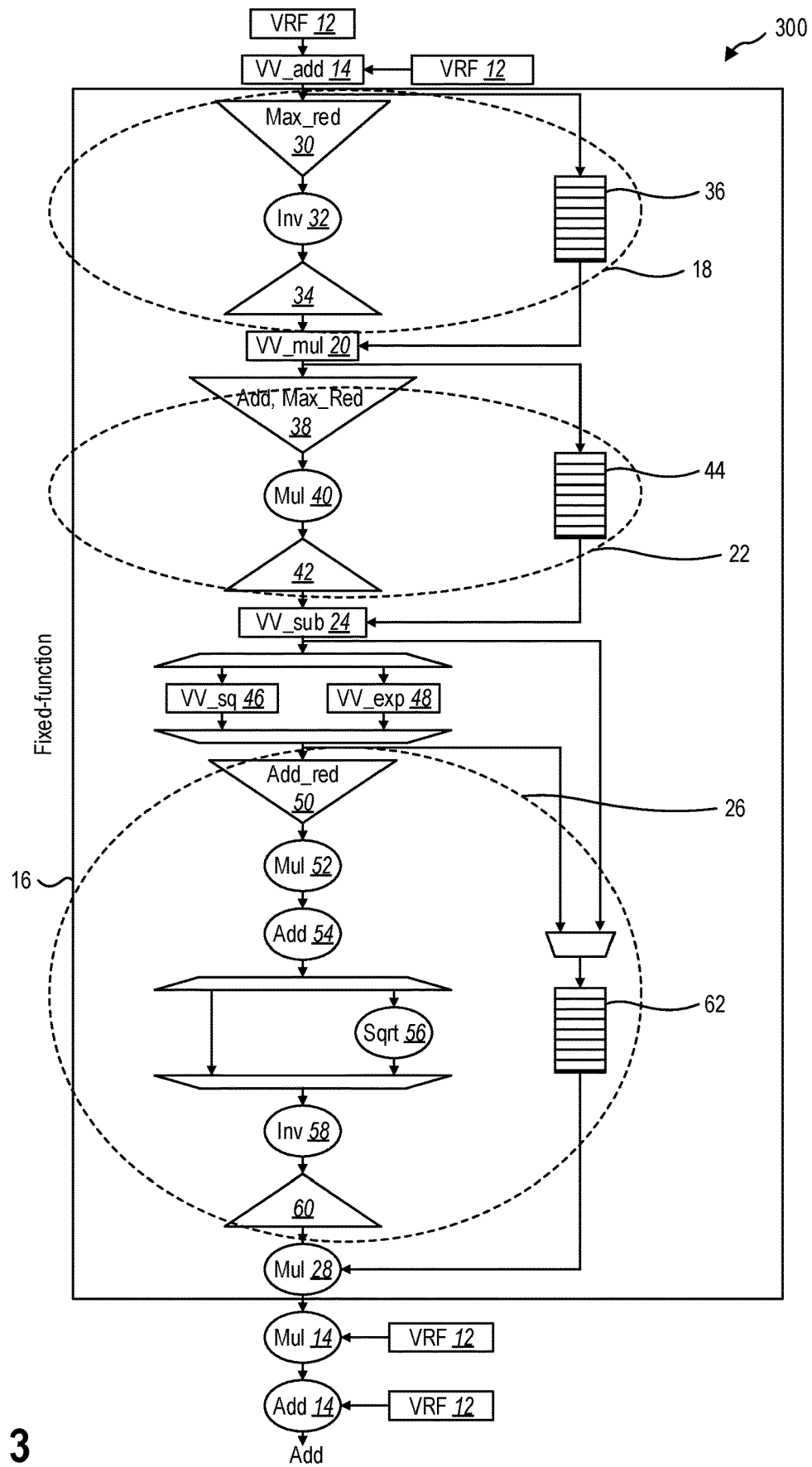
FIG. 3 illustrates an example micro-architecture of a fixed function datapath in accordance with some implementations.

Referring now to FIG. 3, illustrated is an example micro-architecture 300 of a fixed function datapath 16 to accelerate the softmax operation and/or the layer normalization operation. Micro-architecture 300 may include a plurality of VRFs 12 in communication with a MFU 14 that performs a vector to vector addition operation. The MFU 14 may be programmable and may perform any vector element wise operation (e.g., addition or multiplication). The output of MFU 14 is the input for the micro-SPU module 18 of the fixed function datapath 16.

The micro-SPU module 18 takes the vector received from the MFU 14 and performs a max reduction operation 30 on the vector to remove the max element from the vector. The micro-SPU module 18 performs an inverse scalar operation 32 on the vector after the max reduction operation 30 is performed. The micro-SPU module 18 performs a broadcast operation 34 that broadcast the inverse scalar values to a vector. In addition, a first in, first out (FIFO) structure 36 is in parallel with the reduction and broadcasting path performed by the micro-SPU module 18. The FIFO structure 36 is used to receive the vectors from the MFU 14 and forward the vectors to micro-MFU 20.

The output from the micro-SPU module 18 (e.g., the vector broadcasted by the micro-SPU module 18 with the inverse scalar values) is provided as input to the micro-MFU module 20. In addition, the output of the FIFO structure 36 is provided as input to the micro-MFU module 20. The micro-MFU module 20 performs a vector to vector multiplication operation on the vector inputs received (e.g., the broadcast vector from the micro-SPU module 18 and the vector from the FIFO structure 36). The output of the micro-MFU module 20 is provided as input to the FIFO structure 44.

In addition, the output of the micro-MFU module 20 is provided as input to the micro-SPU module 22. The micro-SPU module 22 performs a reduction operation 38 on the vector. The micro-SPU module 22 runs a scalar multiplication operation 40 on the vector and performs a broadcast operation 42 that broadcast the scalar multiplied values to a vector. A FIFO structure 44 is in parallel with the reduction and broadcasting path performed by the micro-SPU module 22. The FIFO structure 44 receives the vector output from the micro-MFU 20 and forwards the vector output to the micro-MFU module 24.

The output of the micro-SPU module 22 and the FIFO structure 44 is provided as input to the micro-MFU module 24. The micro-MFU module 24 performs a vector to vector subtraction operation on the vector input (e.g., the broadcast vector from the micro-SPU module 22 and vector from the FIFO structure 44). In addition, the micro-MFU module 24 performs an element wise square root function 46 and an element wise exponentiation function 48 on the vector. The output of the micro-MFU module 24 is provided as input to the micro-SPU module 26. In addition, output of the micro-MFU module 24 is provided the FIFO structure 62.

The micro-SPU module 26 performs a reduction operation 50 on the vector. The micro-SPU module 26 also performs a scalar multiplication operation 52 and a scalar addition operation 54 on the vector. In addition, the micro-SPU module 26 performs a scalar square root operation 56, a scalar inverse operation 58, and a broadcast operation 60 to broadcast the values to a vector. As such, the micro-SPU module 26 performs a plurality of scalar operations on the vector and broadcast the values to a vector. A FIFO structure 62 is in parallel with the reduction and broadcasting path performed by the micro-SPU module 26. The FIFO structure 62 receives the vector output from the micro-MFU 24 and forwards the vector output to the micro-MFU module 28.

The output of the micro-SPU module 26 and the output of the FIFO structure 62 is provided as input to the micro-MFU module 28 that performs a performs an element wise vector multiplication operation.

The output of the micro-MFU module 28 is provided as input for a MFU 14 that performs a vector to vector multiplication operation and a MFU 14 that performs a vector to vector addition operation. The MFU 14 may be programmable and may perform any vector element wise operation (e.g., addition or multiplication).

The micro-architecture 300 of the fixed function datapath 16 can accelerate both the softmax operation and the layer normalization operation.

Figure 4:
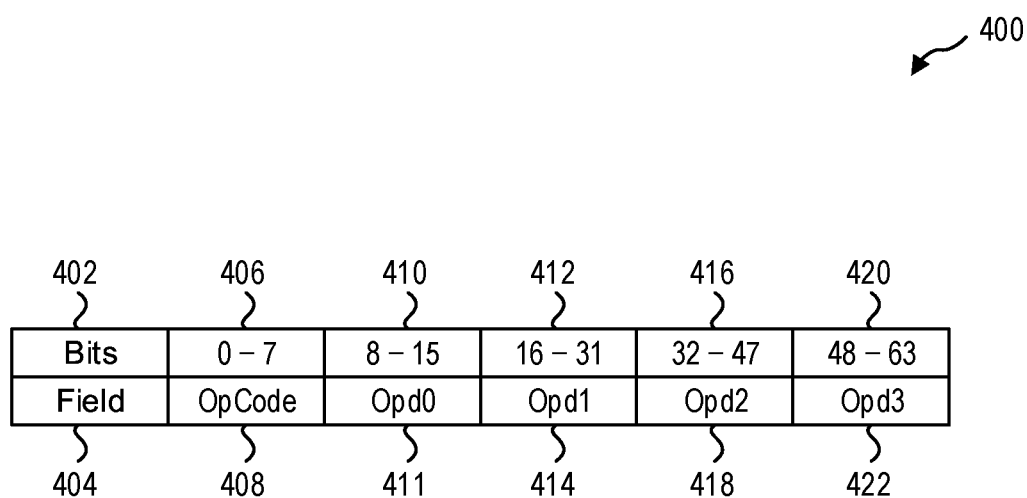
FIG. 4 illustrates an example configurable fixed function instruction for use with an accelerator in accordance with some implementations.

Referring now to FIG. 4, illustrated is an example configurable fixed function instruction 400 for use with an accelerator 500 (FIG. 5). The fixed function instruction 400 includes a common format to provide customized operations for the accelerator 500. In the example, the fixed function instructions 400 provides the information for softmax operation and the layer normalization operation in single instruction.

The fixed function instructions 400 may use an extended instruction (EI) formant that includes a plurality of bits 402 and a corresponding plurality of fields 404. For example, the fixed function instruction includes a 64 bit structure with five fields. A first set of eight bits 406 (bits 0-7) may identify the type of instructions using an OpCode field 408 with an operation code. For example, the operation code may be "v_func" for any accelerator functions to implement. A next set of eight bits 410 (bits 8-15) identifies a specific type of layer of the DNN model to accelerate using an Opd0 field 411. For example, the Opd0 field 411 may be "SoftMax/Layernorm" that identifies two sub-layers of the bidirectional encoder representations from transformers (BERT) model to accelerate (the softmax operation and the layernorm operation). Additional and/or different layers of an DNN model may be identified for acceleration using the Opd0 field 411.

The next set of eight bits 412 (bits 16-31) includes an Opd1 field 414 with data for use with the operations. For example, Opd1 field 414 may include the epsilon values used in the softmax operation and the fp16 format for use with the operations. The next set of eight bits 416 (bits 32-47) includes an Opd2 field 418 with data for use with the operations. For example, the Opd2 field 418 may include data reserved for 1/vecLen and the floating point (fp)16 format for use with the operations. The next set of eight bits 420 (bits 48-63) includes an Opd3 field 422. In some implementations, only OpCode field 408, Opd0 field 411, Opd1 field 414, and Opd2 field 418 are used. In some implementations, only OpCode field 408 and Opd0 field 411 are used.

One example use case of the fixed function instruction 400 is an Extended Instruction (EI) format for the softmax and/or layer normalization acceleration. For example, the OpCode field 408 is "v_func". The Opd0 field 411 "v_softmax( )" is used for the softmax instructions and the Opd0 field 411 "v_layernorm( )" is used for the layer normalization instruction. The required arguments for the softmax and/or the layer normalizatin instructions include "VectorLength," "Epsilon," and "[1/VectorLength]" (to offload 1/x computation from the SLU). For softmax instructions, the Opd1 field 414, the Opd2 field 418, and the Opd3 field 422 are unused. An example fixed function instruction 400 for softmax includes "v_softmax( ):=v_func(ISA_SubOpCode_Softmax, DONTCARE, DONTCARE)." For layer normalization instructions, the Opd1 field 414 is "epsilon," the Opd2 field 418 is "[1/VectorLength]," and the Opd3 field 422 is unused. An example fixed function instruction 400 for layer normalization includes "v_layernorm (eps, vecLen-Inv):=v_func(ISA_SubOpCode_LayerNorm, eps, vecLen-Inv)."

Example program code for use with the softmax instruction may include:
//seqLen=sequence length;
//Iterations=seqLen;
//columns=ceil(seqLen/NativeDim);
SetIterationsCols(bs, iterations, columns);
SetVectorLength(seqLen);
v_rd_inc(MfuInitialVrf, ivrf_initial, columns);
vv_add_inc(AddSubVrf_0, mask, 0);
v_softmax( )
v_wr_inc(MfuInitialVrf, ivrf_result, columns);
where "v_softmax( )" is the OpCode field 408.

Example program code for use with the layer normalization instruction may include:
SetIterationsCols(numVecs, hidden_size);
SetVectorLength(hidden_size*native_dim);
v_rd_inc(MfuInitialVrf, mfuvrf_input_vectors, hidden_size);
vv_add_inc(ASVRF0, hidden_state, hidden_size);
v_layerNorm(epsilon, 1/(hidden_size*native_dim));
vv_mul(MultiplyVrf, mulvrf_weight);
vv_add(AddSubVrf_1, asvrf_bias);
v_wr_inc(MfuInitialVrf,mfuvrf_input_vectors, hidden_size);
where "v_layerNorm" is the OpCode field 408, "epsilon" is the OpCode field 414, and "1/(hidden_size*native_dim)" is the Opd2 field 418.

As such, the fixed function instruction 400 may be used to run the operations for the fixed function datapath 16 (FIG. 2) in one instructions instead of using multiple instructions to perform the operations (e.g., softmax and/or layer normalization). By using one instruction, the code size for the operations can be reduced.

Referring now to FIG. 5, illustrated is an example architecture for a DNN accelerator 500 with a programmable and/or configurable stacked architecture for a fixed function datapath 16 to accelerate one or more layers of a DNN. In some implementations, accelerator 500 receives data from a network 502 for a bidirectional encoder representations from transformers (BERT) model to accelerate. Accelerator 500 includes a plurality of VRFs 12 that receive the data in the vectors for processing. The plurality of VRFs 12 may include one or more of a single port VRF, a multiport VRF, and/or a plurality of banked VRFs. The plurality of VRFs 12 are in communication with one or more programmable MFUs 14 that perform vector operations. Different MFUs 14 may perform different vector operations. The MFUs 14 may be in communication with a Tensor Memory Manager (TMM) 10.

In addition, the one or more MFUs 14 may be in communication with the fixed function datapath 16. The fixed function datapath 16 may include one or more configurable micro-execution units (e.g., micro-SPUs and FIFO 18, 26 and micro-MFUs 20, 28) that execute a series of vector, scalar, reduction, broadcasting, and/or normalization operations for a DNN layer operation in one instruction. For example, the accelerator 500 receives the fixed function instructions 400 (FIG. 4) identifying the DNN layer operation to perform.

The fixed function datapath 16 is a customizable datapath that executes a series of vector, scalar, reduction, and/or broadcasting operations for a specific DNN non-linear layer. The configurable micro-execution units (e.g., micro-SPUs and FIFO 18, 26 and micro MFUs 20, 28) modules may be stacked and/or layered in an order to implement a specific non-linear DNN layer to accelerate.

By using the fixed function datapath 16, performance of the accelerator 500 may be improved by resolving a low hardware utilization problem, which especially occurs at the vector/scalar processing datapath when executing a normalization and/or non-linear operation. Moreover, by using the fixed function datapath 16, accelerator 500 maximize the utilization of vector/scalar processing datapaths in the DNN acceleration by passing data directly between pipelined execution units, without round trips to memory.

In addition, accelerator 500 may provide depth to the pipeline by using the fixed function datapath 16. The architecture of accelerator 500 can achieve a higher throughput and better efficiency for a limited resource and/or area because the architecture can be highly optimized toward the actual DNN layer that a series of data operations to execute is optimally pre-scheduled in hardware regardless of the software/firmware codes. Thus, the architecture of accelerator 500 achieves the high utilization of the whole datapath without inefficiencies which would otherwise occur between many micro-operations, instructions that are executed in a general vector/scalar processor, resulting in a significant reduction in the width of vector/scalar datapath.

In some implementations, the architecture of the accelerator 500 is used in a Stratix 10 GX 2800 FPGA device, resulting in greater than a 5 times resource/area reduction in comparison to previous general vector/scalar processors. In addition, the architecture of accelerator 500 uses smaller code size and a given DNN layer may be executed with just a few instructions. For example, the number of instructions is reduced in accelerator 500 from 20 to 8 for softmax and the number of instructions is reduced in accelerator 500 from 43 to 10 for layer-normalization.

Figure 6:
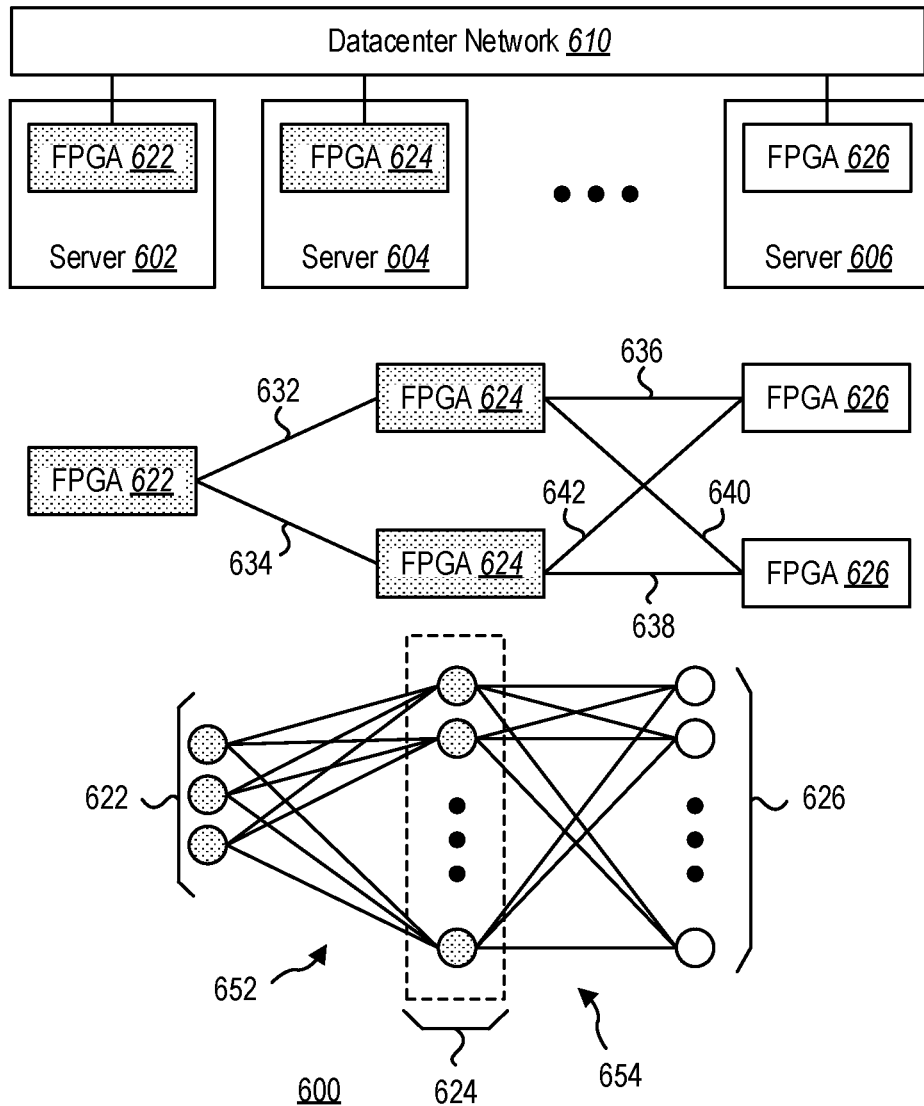
FIG. 6 illustrates a block diagram of a system including nodes interconnected via a datacenter network for use with an accelerator in accordance with some implementations.

FIG. 6 is a block diagram of a system 600 including nodes interconnected via a datacenter network 610 in accordance with one example. For example, as shown in FIG. 6, multiple nodes 602, 604, and 606 may be coupled via the datacenter network. Such nodes may be instantiated and used to parallelize multiple layers of a neural network, such as a Long Short Term Memory (LSTM) network. In one example, each node is implemented as a server and may further include at least one hardware node (e.g., an FPGA). Thus, node 602 may include FPGA 622, node 604 may include FPGA 624, and node 606 may include FPGA 626. The FPGAs may be interconnected via a light transport layer protocol based system. In one example, a first instance of FPGA 622 is coupled via a transport link 632 with a first instance of FPGA 624 and the first instance of FPGA 622 may further be coupled via transport link 634 with the second instance of FPGA 624. The first instance of FPGA 624 may be coupled via a transport link 636 with a first instance of FPGA 626 and the first instance of FPGA 624 may further be coupled via transport link 640 with a first instance of FPGA 626. Similarly, the second instance of FPGA 624 may be coupled via a transport link 642 with the first instance of FPGA 626 and the second instance of FPGA 624 may further be coupled via a transport link 638 with the second instance of FPGA 626. The light transport layer protocol may provide the FPGAs with the ability to transfer or receive packets or other such data from each other via datacenter network 610. The FPGAs may be interconnected in other configurations as well. For example, several instances of FPGA 622 may be coupled via multiple transport links 652 to several instances of FPGA 624. Similarly, several instances of FPGA 624 may be coupled via transport links 654 to several instances of FPGA 626. Although FIG. 6 shows a certain number and arrangement of nodes, including FPGAs, there could be more, or fewer number of nodes arranged differently.

Figure 7:
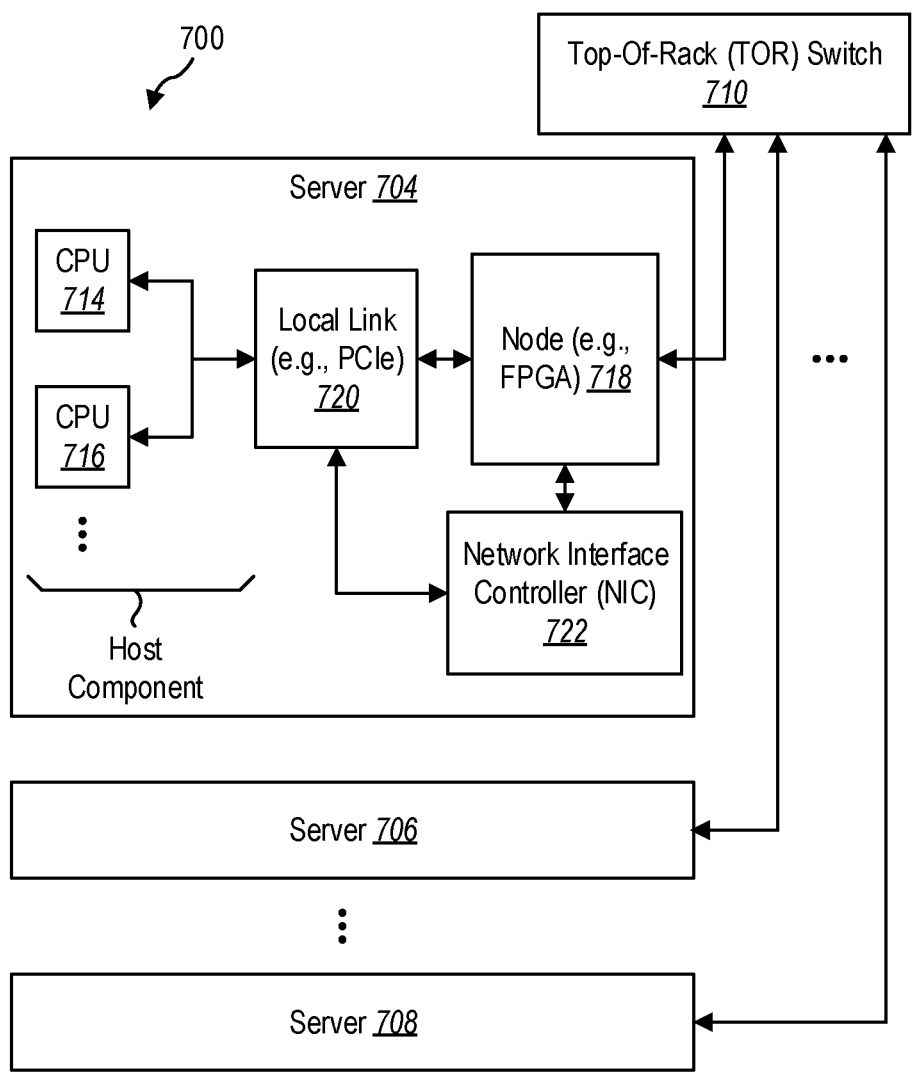
FIG. 7 illustrates a block diagram of a system including distributed nodes for use with an accelerator in accordance with some implementations.

FIG. 7 is a block diagram of a system 700 including distributed nodes in accordance with one example. In this example, the multiple nodes are implemented as a rack of servers in a datacenter. Each of the servers can be coupled to a top-of-rack (TOR) switch. Other racks, although not shown, may have a similar configuration. Each server may include at least one node or multiple nodes. Each node may include a server (e.g., server 704, server 706, or server 708) and each server may be coupled to a TOR switch (e.g., TOR switch 710). Server 704 may include a host component including central processing unit (CPU)s, such as CPU 714 and CPU 716, which may be coupled via a local link (e.g., PCIe) 720 to a hardware node, e.g., FPGA 718. Each hardware node may also be coupled by way of a network interface controller 722 (e.g., used to communicate across the network infrastructure for the data center). The system shown in FIG. 7 may allow nodes to perform processing on messages that are received from (and/or sent to) TOR switch or other switches. Using this example system, individual nodes may send messages comprising packets directly to each other and thus this may allow the partitioning of even a single neural network across multiple FPGAs without incurring unacceptable latencies. For communicating the nodes may use a lightweight protocol, including, for example, RDMA. Although FIG. 7 shows a certain number of components of the system arranged in a certain manner, there could be more, or fewer number of components arranged differently.

Parallelization could also be performed within a layer of a neural network by splitting neural weights across multiple nodes. As an example, a single Recurrent Neural Network (RNN) model (e.g., including LSTM weight matrices) may be partitioned and pinned across multiple nodes. In an implementation of this example, a RNN model may be distributed across the memories (e.g., BRAMs) of each of multiple FPGAs. In this example configuration, each individual FPGA in a multi-stage pipeline may store a fraction of the LSTM weight matrices in a fast on-chip memory (e.g., BRAM). This may advantageously result in a high throughput and yet a low-latency system. At the service start up, the LSTM weight matrices may be decomposed into certain size matrices (e.g., an N by M matrix, where each of N and M is an integer equal to or greater than 8) and then be loaded into the on-chip memories of the FPGAs. A run-time management layer may enable allocation, scheduling, and management of the FPGAs. In one example, each node may be implemented as a HaaS-attached LSTM-focused vector processor based on one or more FPGAs. Each node may be designed to run neural network evaluations as either as a PCIe-attached FPGA or as part of a HaaS pool of FPGAs.

Figure 8:
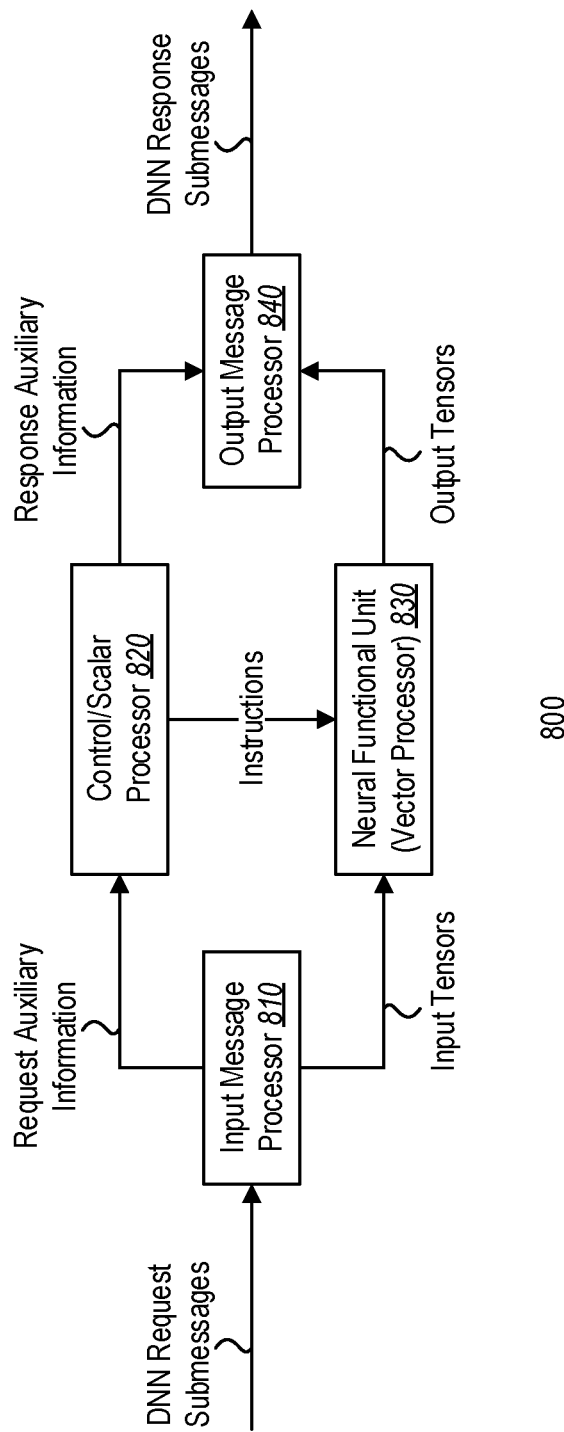
FIG. 8 illustrates a block diagram of a hardware node for use with an accelerator in accordance with some implementations.

FIG. 8 is a block diagram of a hardware node 800 in accordance with one example. Each hardware node 800 may include an Input Message Processor (IMP) 810 for receiving messages from other nodes and an Output Message Processor (OMP) 840 for processing outgoing message to other nodes or components. Each node may further include control/scalar processor (CSP) 820 and a neural functional unit (NFU) 830. Although not shown, the received messages received by a node may be stored in at least two different queues: (1) IMP-to-CSP Auxiliary Queue and (2) IMP-to-NFU Data Queue. Although not shown, the outgoing messages may be stored in at least two different queues: (1) CSP-to-IMP Auxiliary Queue and (2) NFU-to-OMP Data Queue. In this example, the node may accept off-chip messages containing both auxiliary information such as control and scalar data and payload data (e.g., vectors, matrices, or other tensor data structures). The auxiliary information may include a request to perform computationally intensive operations on the payload, and then return a result in the form of an output message. In this example, the incoming messages are handled by a lightweight input message processor (IMP) 810, which sends auxiliary information to control/scalar processor (CSP) 820 (which may be a NIOS-based control processor) and payload data (e.g., input tensors) to neural functional unit (NFU) 830, which may be implemented as a matrix-vector processor. As an example, CSP 820 may then interpret the request, and based on its firmware, may send a series of instructions to NFU 830. After a certain processing latency, the NFU may produce the result of the request, which may be combined with auxiliary data produced by CSP 820 in a lightweight output message processor (OMP) 840 and then sent off-chip. CSP firmware may provide instructions to NFU 830. Further details of the example instructions are discussed as part of the instruction set architecture (ISA). Run-time reloading of the firmware for CSP 820 may also be performed. Thus, in this example, the architecture is largely event driven. The input messages may arrive from many sources (including over the network). IMP may examine the head of the queue of the messages and it can dequeue any instructions that need to be performed and feed it through the system. Although FIG. 8 shows a certain number of components of the example node arranged in a certain manner, there could be more, or fewer number of components arranged differently.

In one example, the NFU is implemented as a matrix-vector processor designed to scale up to the majority of the FPGA's resources. In this example, the primary hardware acceleration goal of the NFU is to perform matrix-vector multiplications at high throughput and low latency with its matrix-vector unit (MVU) by applying thousands of multiply-adders. The NFU may receive matrices of coefficients (e.g., constants) and may be used for multiplying these coefficients with the dynamic input vector data. Thus, instead of storing the coefficients in a dynamic random-access memory (DRAM) corresponding to a CPU/graphics processing unit (GPU), the coefficients may be pre-loaded at the service startup time into the on-chip memories (e.g., block random access memories (BRAMs) of FPGAs) corresponding to the NFU. In one example, the coefficients once loaded may never be re-loaded again unless the neural network model being used is modified or the service is restarted. As part of this example, the model may be partitioned and pinned in a distributed manner to the on-chip memories of multiple nodes (e.g., FPGAs) connected in a manner that they can transfer messages or packets to each other directly without relying upon assistance from CPU resources.

In one example, the MVU is fully pipelined and capable of performing an $O(n^2)$ complexity matrix-vector multiplication in $O(n)$ time, at a performance of 400-1800 billion fixed point operations per second. While matrix-vector multiplications may represent the vast majority of the fixed-point operations required to evaluate an LSTM layer, the evaluation can also contain a variety of vector reductions, transcendentals, and the addition of bias vectors. The NFU may also implement pipelined multifunction units (MFUs) to handle these $O(n)$ complexity vector functions in $O(n)$ time. These MFUs may be organized into a chain architecture, with the MVU passing data to the first MFU, the first MFU passing data to the second MFU, and so on. In one example implementation of the NFU, 1 MVU and 5 MFUs may be used.

The chain architecture may allow the NFU to exploit massive pipeline parallelism between a single matrix-vector multiplication and several vector functions, based on the observation that vector functions could potentially dominate LSTM evaluation time in an architecture where vector and matrix-vector operations take approximately the same amount of time to compute. The NFU's memory subsystem may also be configured to support high throughput. As an example, the memory subsystem may support up to 1.8 TB/s of matrix value throughput along with support for loading 6 vectors and storing 6 vectors simultaneously.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, embodiments of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. Unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

INDUSTRIAL APPLICABILITY

The architecture of the devices provide a semi-programmable, co-accelerator capable of supporting the execution of both the Softmax and Layer Normalization operations by exploiting both pipeline and single instruction, multiple data (SIMD) parallelism in an area-efficient and highly-performant architecture. The devices may be used for any non-linear DNN layer operation that involves vector, scalar, and/or reduction operations rather than a regular tensor and activation neural layers.

The devices maximize the utilization of vector/scalar processing datapaths in the DNN acceleration by passing data directly between pipelined execution units, without round trips to memory, and customizing the quantity, variety, and order of execution units to the nonlinearity kernel such that the majority of execution units may be utilized simultaneously during execution.

The devices stack both the programmable vector/scalar processing units and the hardwired but configurable vector/scalar processing units in a pipe. The architecture of the devices described herein maximizes the use of pipeline by increasing the depth of the pipeline (as opposed to other techniques which rely primarily or exclusively on data parallelism), which ensures the current DNN layer may be executed with maximal throughput in a full pipeline without inefficiencies between instructions. In some implementations, the architecture of the devices described herein maximizes the use of the pipeline by increasing both the depth of the pipeline and width of the pipeline using parallelism to scale performance by applying data (SIMD) parallelism. As such, wasting resources may be avoided for the datapath controls which rarely change but minimize the complexity of the control-path by adding a fixed-function instruction and a datapath that may execute a given DNN layer (such as softmax and/or layer normalization) in one instruction.

The architecture of the devices of the present disclosure takes a hybrid of complex instruction set computer (CISC) and RISC providing not only generic vector programmability with element-wise vector instructions (in addition, a programmable scalar unit may also be added into the execution pipe) but also a fixed-function instruction that optimally runs the required DNN layer operation (such as softmax and layer-normalization). The architecture requires a significantly lower area/resource because a series of micro-operations is optimally pre-scheduled in the hardware execution unit pipe regardless of the software/firmware codes. Moreover, the architecture may use a serial and bypass micro-architecture for the fixed-function datapath. The structure of the architecture may have configurable limited vector processing units (e.g., micro-MFU, or u-MFU) and configurable limited vector-to-scalar, scalar-to-scalar, scalar-to-vector processing units with a forwarding path (e.g., micro-SPU and FIFO, or u-SPU and FIFO). The configurable micro-MFU and the configurable micro-SPU modules may be stacked with the structure to implement a given non-linear DNN layer to accelerate, which can be further optimized by flattening afterwards.

The architecture provides programmability and configurability to fully utilize the datapath for a variety of models and inference parameters. The architecture may execute generic element-wise vector instructions (e.g., add a mask in the scaled-dot-product operation, add arbitrary vectors before the layer-normalization operations). Moreover, the accelerator datapath of the devices described herein has its own programmability that may execute different DNN layer acceleration instructions. For example, the accelerator datapaths of the devices described herein has a programmability on its connection on the series of vector add, multiply, exponentiation, max reductions, sum reductions, and broadcasting execution units so that the given datapath is maximally utilized for both softmax and layer-normalization DNN layers, which can be dynamically configured with instructions. One technical advantage of the programmability allows the architecture of the devices to support a wide range of transformer-based models (e.g., models with different number of heads) and different queries coming for inference (e.g., different sequence lengths of input tokens).

In addition, the fixed function datapath of the architecture of the devices is a micro-architecture that includes a series of vector micro-execution units and vector-to-scalar reduction, scalar, scalar-to-vector micro-execution units with a forwarding path. One technical advantage of the structure of the architecture of the devices is the re-configuration of the structure is easy and the structure may cover wide range of non-linear DNN layers that can be implemented with vector/scalar and reduction/broadcasting operations.

Another technical advantage of the devices is improving the performance of a DNN accelerator by resolving a low hardware utilization problem, which especially occurs at the vector/scalar processing datapath when executing a normalization and/or non-linear operation.

Another technical advantage is the architecture of the devices is both programmable from software and configurable from hardware, which is especially helpful in the field programmable gate array (FPGA) platform. The MFUs keep their programmability and may be used for many different purposes (e.g., element-wise vector addition, multiplication, passthrough, for example, mask addition in softmax, and/or input addition in layer-normalization). The fixed-function datapath is also programmable so that it can execute a series of vector/scalar/normalization operations to run either softmax, layerNorm, and/or passthrough. The fixed-function datapath is configurable on the hardware level too with the proposed micro-architecture with the fixed-function datapath that is easily customizable depending on a DNN model the micro-architecture accelerates, which is especially helpful in FPGA platform that a fixed-function datapath can be reconfigured and optimized depending on DNN models to accelerate.

One example existing solution is wide SIMD vector processors that increase the width of the datapath. In contrast to the existing solutions that increase the width of the datapath, the architecture of the devices of the present disclosure provide depth to the pipeline. The architecture of the devices has an advantage over existing solutions, as the architecture can achieve a higher throughput and better efficiency for a limited resource and/or area because the architecture can be highly optimized toward the actual DNN layer that a series of data operations to execute is optimally pre-scheduled in hardware regardless of the software/firmware codes. Thus, the architecture of the devices of the present disclosure easily achieves the high utilization of the whole datapath without inefficiencies which would otherwise occur between many micro-operations, instructions that are executed in a general vector/scalar processor, resulting in a significant reduction in the width of vector/scalar datapath. For example, in the Stratix 10 GX 2800 FPGA device, the described architecture gives greater than a 5 times resource/area reduction in comparison to previous general vector/scalar processors.

Another technical advantage of the architecture of the devices of the present disclosure is smaller code size and simpler decoding logic, and/or control path that a given DNN layer may be executed with just a few instructions. For example, the number of instructions is reduced from 20 to 8 for softmax and the number of instructions is reduced from 43 to 10 for layer-normalization.

Another example of an existing solution is an approach that uses high-level synthesis (HLS). In comparison to HLS, the devices described herein provide compact, efficient micro-architecture with readability and configurability. The architecture of the devices of the present disclosure is a stacked architecture composed of a modular generic vector processing block (e.g., MFU), scalar processing block with both reduction and broadcasting (e.g., SPU), and a customized datapath (e.g., fixed-function datapath) that executes series of vector/scalar/reduction/broadcasting operations for a specific DNN non-linear layer it accelerates. One technical advantage of the modular programmable vector/scalar units (e.g., MFU and SPU) and the modular micro-execution units in the fixed-function unit (e.g., u-MFU and u-SPU) is the optimization of the modules and the ability to keep using the modules and only changing the customized datapath when necessary.

(A1) Some implementations include a configurable stacked architecture (e.g., architecture 200) for a fixed function datapath (e.g., datapath 16) for use with an accelerator (e.g., accelerator 500) to accelerate an operation of a deep neural network (DNN). The configurable stacked architecture includes a plurality of configurable micro-scalar processing units (SPUs) (e.g., micro-SPUs 18, 22 26) that perform at least one scalar operation (e.g., inverse scalar operation 32, scalar multiplication operation 40, scalar multiplication operation 52, scalar addition operation 54, scalar square root operation 56, scalar inverse operation 58) on vector values from a received vector. The configurable stacked architecture also includes a plurality of configurable micro-multi-functional units (MFUs) (e.g., micro-MFU 20, micro-MFU 28, micro-MFU 28) that perform vector operations on the vector values, where the plurality of configurable micro-SPUs and the plurality of configurable micro-MFUs are placed in an order to perform the operation of the DNN where an output of one micro-SPU of the plurality of configurable micro-SPUs is provided as an input to one micro-MFU of the plurality of configurable micro-MFUs.

(A2) In some implementations of the stacked architecture of A1, each micro-SPU of the plurality of configurable micro-SPUs further performs a reduction operation on the vector values, the at least one scalar operation on the vector values, and a broadcast operation to broadcast the vector values to a vector.

(A3) In some implementations of the stacked architect of A1 or A2, the operation is a softmax operation or a layer normalization operation.

(A4) In some implementations of the stacked architect of any of A1-A3, the operation is a non-linear operation that involves at least one of: vector operations, scalar operations, or reduction operations.

(A5) In some implementations of the stacked architect of any of A1-A4, a number of micro-SPUs for the plurality of configurable micro-SPUs and a number of micro-MFUs for the plurality of configurable micro-MFUs is selected based on the operation.

(A6) In some implementations of the stacked architect of any of A1-A5, the plurality of configurable micro-SPUs and the plurality of configurable micro-MFUs is selected based on the operation.

(A7) In some implementations of the stacked architect of any of A1-A6, the order of the plurality of configurable micro-SPUs and the plurality of configurable micro-MFUs is selected based on the operation.

(A8) In some implementations of the stacked architect of any of A1-A7, the plurality of configurable micro-SPUs and the plurality of configurable micro-MFUs perform the operation without intermediate accesses to memory of the accelerator.

(A9) In some implementations, the stacked architect of any of A1-A8 includes a plurality of first in, first out (FIFO) structures (e.g., FIFO structure 36, FIFO structure 44, FIFO structure 62) that provide the vector values output from a previous micro-MFU to a next micro-MFU in the order, where one FIFO structure of the plurality of FIFO structures is parallel to each micro-SPU of the plurality of micro-SPUs.

(A10) In some implementations, the stacked architect of any of A1-A9 includes at least one programmable MFU in communication with one or more micro-SPUs of the plurality of configurable micro-SPUs, where the output of the at least one programmable MFU is provided as an input to the one or more micro-SPUs.

(A11) In some implementations, the stacked architect of any of A1-A10 includes a first programmable MFU in communication with a first micro-SPU of the plurality of configurable micro-SPUs; a second programmable MFU in communication with a last micro-SPU of the plurality of configurable micro-SPUs; and a third programmable MFU in communication with the second programmable MFU.

(A12) In some implementations, the stacked architect of any of A1-A11 includes at least one programmable SPU.

(B1) Some implementations include an accelerator (e.g., accelerator 500). The accelerator includes a plurality of vector register files (VRFs) (e.g., VRFs 12) that provide one or more vectors with data for the accelerator. The accelerator includes a plurality of programmable multi-functional units (MFUs) (e.g., programmable MFUs 14) in communication with the VRFs to perform vector operations on vector values from the one or more vectors. The accelerator also includes at least one programmable scalar processing unit (SPU). The accelerator also includes a configurable stacked architecture (e.g., architecture 200) with a fixed function datapath (e.g., fixed function datapath 16) in communication with the plurality of programmable MFUs, where the stacked architecture performs a non-linear operation on the vector values to accelerate a layer of a DNN.

(B2) In some implementations, the accelerator of B1 includes a plurality of configurable limited scalar processing units (SPUs) (e.g., micro-SPUs 18, 22 26) that perform at least one scalar operation on the vector values; and a plurality of configurable limited vector processing units (e.g., micro-MFU 20, micro-MFU 28, micro-MFU 28) that perform vector operations on the vector values.

(B3) In some implementations of the accelerator of B1 or B2, the plurality of configurable limited SPUs and the plurality of configurable limited vector processing units are stacked in an order to perform the operation.

(B4) In some implementations of the accelerator of any of B1-B3, an output of a first limited SPU of the plurality of configurable limited SPUs is provided as input to a first limited vector processing unit of the plurality of configurable limited vector processing units and the output of the first limited vector processing unit is provided as input to a second limited SPU of the plurality of configurable limited SPUs.

(B5) In some implementations, the accelerator of any of B1-B4 includes a plurality of first in, first out (FIFO) structures (e.g., FIFO structure 36, FIFO structure 44, FIFO structure 62) that provide the vector values output from a previous limited vector processing unit to a next limited vector processing unit in the order, where one FIFO structure of the plurality of FIFO structures is parallel to each limited SPU of the plurality of configurable limited SPUs.

(B6) In some implementations of the accelerator of any of B1-B5, each limited SPU of the plurality of configurable limited SPUs performs a reduction operation, the at least one scalar operation, and a broadcast operation to broadcast the vector values to a vector.

(B7) In some implementations of the accelerator of any of B1-B6, the plurality of configurable limited SPUs and the plurality of configurable limited vector processing units are selected based on the non-linear operation to accelerate.

(B8) In some implementations of the accelerator of any of B1-B7, the accelerator uses a fixed function instruction to identify the non-linear operation to accelerate.

(B9) In some implementations of the accelerator of any of B1-B8, the DNN is a bidirectional encoder representations from transformers (BERT) model and the non-linear operation is one of a softmax operation or a layer normalization operation.

(C1) Some implementations include a configurable stacked architecture (e.g., architecture 200) for a fixed function datapath (e.g., fixed function datapath 16) for use with an accelerator (e.g., accelerator 500) to accelerate a softmax operation or a layer normalization operation of a deep neural network (DNN). The stacked architecture includes a first micro-scalar processing unit (SPUs) (e.g., micro-SPU 18) that performs a max reduction operation on received vector values from a programmable multi-functional unit (MFU) (e.g., programmable MFU 14) of the accelerator, a scalar inverse operation (e.g., inverse scalar operation 32) on the received vector values, and a broadcast operation that broadcasts the vector values to a vector. The stacked architecture includes a first micro-multi-functional unit (MFU) (e.g., micro-MFU module 20) that receives the vector values from the first micro-SPU and performs a vector multiplication operation on the vector values. The stacked architecture also includes a second micro-SPU (e.g., micro-SPU 22) that receives the vector values from the first micro-MFU and performs a reduction operation on the vector values, a scalar multiplication operation (e.g., scalar multiplication operation 40) on the vector values, and the broadcast operation that broadcasts the vector values to the vector. The stacked architecture also includes a second micro-MFU (e.g., micro-MFU 24) that receives the vector values from the second micro-SPU and performs a vector subtraction operation, a vector square root operation (e.g., element wise square root function 46), and a vector exponentiation operation (e.g., an element wise exponentiation function 48) on the vector values of the vector. The stacked architecture also includes a third micro-SPU (e.g., micro-SPU 26) that receives the vector values from the second micro-MFU and performs a reduction operation on the vector values, a scalar multiplication operation (e.g., scalar multiplication operation 52) on the vector values, a scalar addition operation (e.g., scalar addition operation 54) on the vector values, a scalar square root operation (e.g., scalar square root operation 56) on the vector values, a scalar inverse operation (e.g., scalar inverse operation 58) on the vector values, and the broadcast operation that broadcasts the vector values to the vector. The stacked architecture also includes a third micro-MFU (e.g., micro-MFU 28) that receives the vector from the third micro-SPU and performs a vector multiplication operation on the vector values of the vector.

(C2) In some implementations, the stacked architecture of C1 includes a first in, first out (FIFO) structure (e.g., FIFO structure 36) that receives the vector values from the programmable MFU and provides the vector values from the programmable MFU to the first micro-MFU, where the FIFO structure is parallel to the first micro-SPU; a second FIFO structure (e.g., FIFO structure 44) that receives the vector values modified by the first micro-MFU and provides the modified vector values by the first micro-MFU to the second micro-MFU, where the second FIFO structure is parallel to the second micro-SPU; and a third FIFO structure (e.g., (e.g., FIFO structure 62) that receives the vector values modified by the second micro-MFU and provides the modified vector values by the second micro-MFU to the third micro-MFU, where the third FIFO structure is parallel to the third micro-SPU.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A configurable stacked architecture for a fixed function datapath for use with an accelerator to accelerate an operation of a deep neural network (DNN), comprising:
    a first micro-scalar processing unit (SPUs) that performs a first scalar operation on received vector values from a programmable multi-functional unit (MFU) of the accelerator;
    a first micro-multi-functional unit (MFU) that receives the vector values from the first micro-SPU and performs a first vector operation on the vector values;
    a second micro-SPU that receives the vector values from the first micro-MFU and performs a second scalar operation on the vector values;

a second micro-MFU that receives the vector values from the second micro-SPU and performs a second vector operation on the vector values of the vector;

a third micro-SPU that receives the vector values from the second micro-MFU and performs a third scalar operation on the vector values; and a third micro-MFU that receives the vector from the third micro-SPU and performs a third vector operation on the vector values of the vector.

2. The stacked architecture of claim 1, further comprising:
a first in, first out (FIFO) structure that receives the vector values from the programmable MFU and provides the vector values from the programmable MFU to the first micro-MFU, wherein the FIFO structure is parallel to the first micro-SPU.

3. The stacked architecture of claim 2, wherein the vector values modified by the first micro-SPU and the vector values from the programmable MFU are provided as input to the first micro-MFU.

4. The stacked architecture of claim 1, further comprising:
a second first in, first out (FIFO) structure that receives the vector values modified by the first micro-MFU and provides the modified vector values by the first micro-MFU to the second micro-MFU, wherein the second FIFO structure is parallel to the second micro-SPU.

5. The stacked architecture of claim 4, wherein the vector values modified by the second micro-SPU and the modified vector values from the first micro-MFU are provided as input to the second micro-MFU.

6. The stacked architecture of claim 1, further comprising:
a third first in, first out (FIFO) structure that receives the vector values modified by the second micro-MFU and provides the modified vector values by the second micro-MFU to the third micro-MFU, wherein the third FIFO structure is parallel to the third micro-SPU.

7. The stacked architecture of claim 6, wherein the vector values modified by the third micro-SPU and the modified vector values by the second micro-MFU are provided as input to the third micro-MFU.

8. The stacked architecture of claim 1, wherein the operation of the DNN is a softmax operation.

9. The stacked architecture of claim 1, wherein the operation of the DNN is a layer normalization operation.

10. The stacked architecture of claim 1, wherein the vector values modified by the first micro-MFU are provided as input to the second micro-SPU.

11. The stacked architecture of claim 1, wherein the vector values modified by the second micro-MFU are provided as input to the third micro-SPU.

12. The stacked architecture of claim 1, wherein the third scalar operation includes a plurality of scalar operations.

13. The stacked architecture of claim 1, wherein the second vector operation includes a plurality of vector operations.

14. The stacked architecture of claim 1, wherein the first micro-SPU further performs a reduction operation on the vector values and a broadcast operation to broadcast the vector values.

15. The stacked architecture of claim 1, wherein the second micro-SPU further performs a reduction operation on the vector values and a broadcast operation to broadcast the vector values.

16. The stacked architecture of claim 1, wherein the third micro-SPU further performs a reduction operation on the vector values and a broadcast operation to broadcast the vector values.

17. The stacked architecture of claim 1, further comprising:
a plurality of vector register files (VRFs) in communication with a plurality of programmable multi-functional units (MFUs).

18. The stacked architecture of claim 17, wherein the plurality of VRFs provide one or more vectors with data for the accelerator.

19. The stacked architecture of claim 17, wherein an output of the third micro-MFU is provided as input to a programmable MFU of the plurality of MFUs.

20. The stacked architecture of claim 17, wherein the plurality of programmable MFUs are programed to perform different vector element wise operations.

* * * * *